Sept. 2, 1947. H. P. REES ET AL 2,426,748
HOT TOP
Filed Jan. 23, 1945

INVENTOR.
HIRAM P. REES
JOHN BIDNER
BY
Kwis Hudson Boughton & Williams
ATTORNEYS Patented Sept. 2, 1947

2,426,748

UNITED STATES PATENT OFFICE 2,426,748

HOT TOP

Hiram P. Rees, Girard, and John Bidner, Youngstown, Ohio, assignors, by mesne assignments, to The Ferro Engineering Company, Cleveland, Ohio, a corporation of Ohio Application January 23, 1945, Serial No. 574,125

1 Claim. (Cl. 22—147)

This invention relates to improvements in hot tops, more particularly to the construction and disposition of wiper strips therefor.

In hot tops of the type which extend into the mold and are caused to float on the molten metal when the latter rises to the required height, it is conventional practice to employ sheet metal wiper strips which extend around the perimeter of the hot top and wipe against the mold walls as the hot top is lowered into position. Where the mold is of polygonal cross-section, there is usually a separate strip for each wall of the hot top, and together these strips bridge the clearance space between the hot top and the mold, with the hot top centered in the mold.

In accordance with the present invention the wiper strip construction is simplified in the respect that it extends only about half way around the hot top instead of completely around it. In order that this shorter wiper strip may function correctly those portions of the hot top which are not equipped with the wiper strip are forced against the interior wall of the mold and the projecting portion of the wiper strip is increased in width sufficiently over that of the conventional strip to completely bridge the clearance between the hot top and the mold. Preferably we mount the wiper strip on the bottom of the hot top, and thus prevent the formation of any substantial amount of fin on the ingot.

One of the objects of the invention therefore is the simplification of wiper strips for ingot molds.

Another object is the provision of a wiper strip construction which will reduce or eliminate the fins normally formed on the ingot between the mold and the hot top.

Still another object of the invention is to render it easy for the workman pouring the metal to observe when the metal has risen in the mold to the level of the bottom of the hot top.

Other objects and features of novelty will appear as we proceed with the description of those embodiments of the invention which, for the purposes of the present application, we have illustrated in the accompanying drawing, in which Fig. 1 is an elevational view, partly broken away and partly in vertical section, of a fragment of an ingot mold and a hot top embodying the invention.

Figure 2:
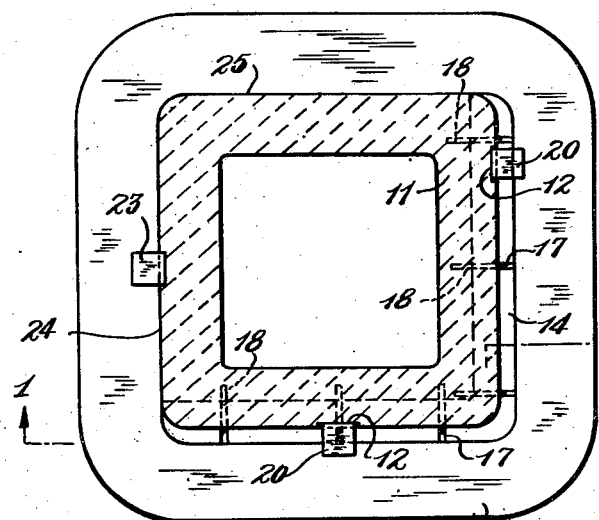
Fig. 2 is a horizontal sectional view taken substantially on the line 2—2 of Fig. 1.
Figure 1:
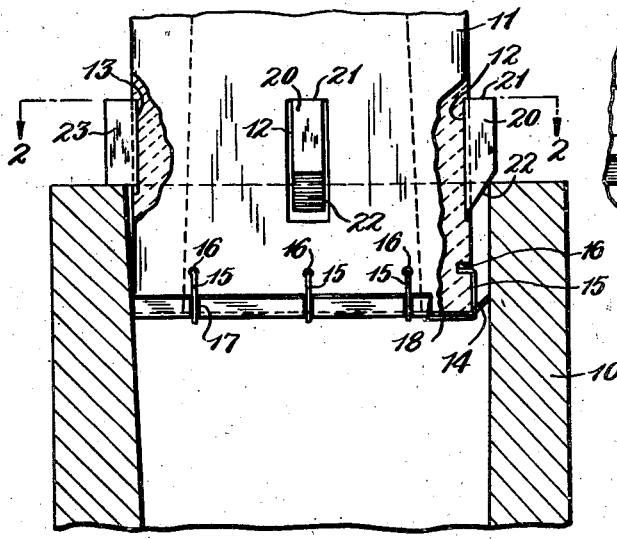
Figure 4:
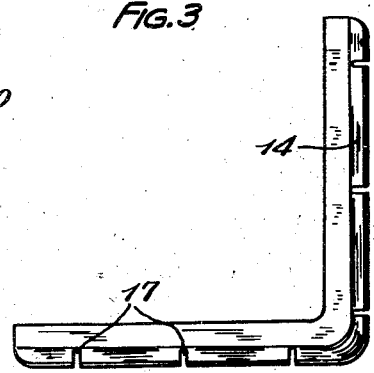
Fig. 4 is a plan view of a wiper strip for a hot top of square cross-section constructed in accordance with the invention.

In the drawing 10 represents an ingot mold of the big end up type. As illustrated the mold is substantially square in horizontal section, but it should be understood that the invention is applicable to hot tops for rectangular molds of other proportions, and in fact to molds which have cross-sections other than rectangular. The hot top 11 illustrated in Figs. 1 and 2 is a one-piece clay hot top adapted for a single use. On two adjacent sides it is provided with vertically elongated sockets 12 having square shoulders at the top, and on at least one other side it is provided with a socket 13 which may be shorter than the sockets 12. A sheet metal wiper strip 14 is attached to the bottom surface of the two adjacent walls of the hot top in which the sockets 12 are formed. A convenient means of attachment, as herein shown, consists of a series of spring wire clips 15, the upper inwardly bent ends of which are caused to extend into small recesses 16 formed in the hot top. At the proper positions the wiper strip is slotted, as indicated at 17, to receive the upright portions of the clips 15, and the lower horizontal portions 18 of the clips are snapped or sprung inwardly beneath that part of the wiper strip which is disposed against the bottom surface of the hot top.

When the hot top with the wiper strip attached is lowered into the mold, the projecting portions of the wiper strip 14 tend to guide the hot top into the off-center position illustrated. As the hot top is lowered further, blocks 20 with square upper ends 21 and tapered or beveled lower ends 22 are inserted into the sockets 12 and a block 23 with square upper and lower ends is inserted into the socket 13. The upper ends of each of these blocks engage beneath the square shoulders at the upper ends of the sockets 12 and 13. The tapered or beveled surfaces 22 engage the inner upper edge of the mold on two adjacent sides of the latter and force the hot top over so that at least the lower ends of the remaining side walls 24 and 25 closely engage the corresponding inner walls of the mold, while the block 23 acts as a support merely. A three point support is preferred, but of course an additional block 23 could be provided if desired on the side 25 of the hot top.

Figure 3:
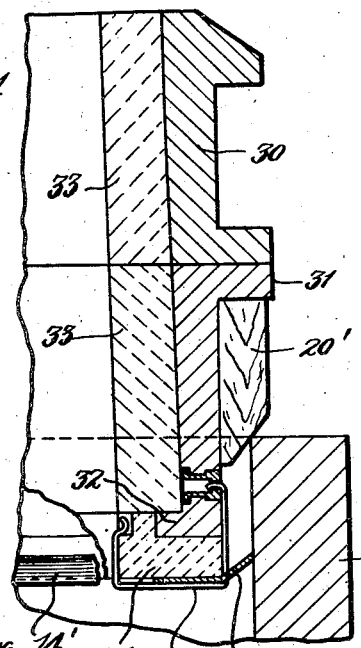
Fig. 3 is a fragmental vertical sectional view of a composite hot top in which the invention is embodied.

In the form of the invention illustrated in Fig. 3, the hot top comprises an iron housing 30 composed of one or more castings and having a horizontal flange 31 or other projecting parts against which supporting blocks may engage. The housing has a bottom ledge 32 upon which are supported lining blocks 33. A bottom ring 34 of refractory material, intended for single use, protects the lower ends of the housing and lining. Spring clips 35 of the type disclosed in Patent No. 2,080,848, issued May 18, 1937, to Walter M. Charman, support the wiper strip 14' and also the bottom ring 34. The strip 14' it will be understood is similar to the strip 14 of the first described form of the invention. Two blocks 20' tapered on their lower ends, disposed on two adjacent sides of the hot top like the blocks 20, are employed for the double purpose of supporting the hot top and forcing those sides of the bottom ring which are not equipped with a wiper strip against the corresponding walls of the mold. A square ended block similar to block 23 is employed upon one of the latter walls for the same purpose as block 23. The method of assembling and using this form of the invention is the same as that previously described for the form of Figs. 1 and 2.

Having thus described our invention, we claim:

In a rectangular hot top adapted for insertion into a big-end-up ingot mold, a one piece resilient wiper strip extending along two adjacent sides only of the hot top near the lower edge thereof and around the corner between those sides, said strip having a portion projecting outwardly beyond the body of the hot top of a width sufficient to take up the clearance between the hot top and the mold, said projecting portion extending diagonally upward and tending to crowd the remaining lower edges of the hot top against the corresponding walls of the mold as the hot top is lowered thereinto.

HIRAM P. REES.
JOHN BIDNER.

REFERENCES CITED

The following references are of record in the file of this patent:

UNITED STATES PATENTS

| Number | Name | Date |
|---|---|---|
| 2,287,772 | Anthony | June 30, 1942 |
| 1,997,677 | Charman | Apr. 16, 1935 |
| 1,654,057 | Smith | Dec. 27, 1927 |
| 1,738,209 | Rowe | Dec. 3, 1929 |
| 1,850,060 | Haws | Mar. 15, 1932 |